(12) United States Patent
Bean et al.

(10) Patent No.: US 12,183,316 B2
(45) Date of Patent: Dec. 31, 2024

(54) METHOD FOR ADJUSTING NOISE CANCELLATION IN HEADPHONES BASED ON REAL-WORLD ACTIVITY OR GAME CONTEXT

(71) Applicant: Sony Interactive Entertainment Inc., Tokyo (JP)

(72) Inventors: Celeste Bean, San Francisco, CA (US); Tatianna Manzon-Gutzman, San Mateo, CA (US); Sarah Karp, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 259 days.

(21) Appl. No.: 17/827,678

(22) Filed: May 28, 2022

(65) Prior Publication Data

US 2023/0386443 A1 Nov. 30, 2023

(51) Int. Cl.
*G10K 11/178* (2006.01)
*H04R 1/10* (2006.01)

(52) U.S. Cl.
CPC .. *G10K 11/17823* (2018.01); *G10K 11/17827* (2018.01); *H04R 1/1083* (2013.01); *H04R 2460/01* (2013.01)

(58) Field of Classification Search
CPC ........ G10K 11/17823; G10K 11/17827; H04R 1/1083; H04R 2460/01
See application file for complete search history.

(56) References Cited

U.S. PATENT DOCUMENTS

| 10,154,360 B2* | 12/2018 | Lovitt | H04S 7/302 |
| 2013/0293723 A1 | 11/2013 | Benson et al. | |
| 2014/0328505 A1* | 11/2014 | Heinemann | G06F 3/012 |
| | | | 381/303 |
| 2021/0090545 A1* | 3/2021 | Clark | G06F 3/165 |

OTHER PUBLICATIONS

PCT/US2023/018839 Invitation to Pay Additional Fees and, Where Applicable, Protest Fee, Jul. 17, 2023, ISA/206.
Anonymous: "Casque sans fil à réduction de bruit WH-1000XM4 ; Sony France", Aug. 6, 2020, pp. 1-26, XP93061619. URL:https%3A%2F%2Fwww.Sony.fr%2Felectronics%2Fcasque-bandeau%2Fwh-1000xm4.

* cited by examiner

*Primary Examiner* — Jason R Kurr
(74) *Attorney, Agent, or Firm* — Penilla IP, APC (57) ABSTRACT

A method is provided, including: executing an interactive application, wherein executing the interactive application includes rendering video and audio of a virtual environment, the video being presented on a display viewed by a user, and the audio being presented through headphones worn by the user, and wherein executing the interactive application is responsive to user input generated from interactivity by the user with the presented video and audio; receiving environmental input from at least one sensor that senses a local environment in which the user is disposed; analyzing the environmental input to identify activity occurring in the local environment; responsive to identifying the activity, then adjusting a level of active noise cancellation applied by the headphones.

17 Claims, 6 Drawing Sheets

METHOD FOR ADJUSTING NOISE CANCELLATION IN HEADPHONES BASED ON REAL-WORLD ACTIVITY OR GAME CONTEXT

1. FIELD OF THE DISCLOSURE

The present disclosure relates generally to adjusting noise cancellation in headphones based on real-world activity or game context.

BACKGROUND

2. Description of the Related Art

The video game industry has seen many changes over the years. As technology advances, a trend in video games is towards the achievement of greater immersion through sophisticated graphics, realistic sounds, engaging soundtracks, haptics, etc. Players are able to enjoy immersive gaming experiences in which they participate and engage in virtual environments, rather than their local physical environments.

It is in this context that implementations of the disclosure arise.

SUMMARY

Implementations of the present disclosure include methods, systems, and devices relating to adjusting noise cancellation in headphones based on real-world activity or game context.

In some implementations, a method is provided, including the following method operations: executing an interactive application, wherein executing the interactive application includes rendering video and audio of a virtual environment, the video being presented on a display viewed by a user, and the audio being presented through headphones worn by the user, and wherein executing the interactive application is responsive to user input generated from interactivity by the user with the presented video and audio; receiving environmental input from at least one sensor that senses a local environment in which the user is disposed; analyzing the environmental input to identify activity occurring in the local environment; responsive to identifying the activity, then adjusting a level of active noise cancellation applied by the headphones.

In some implementations, the active noise cancellation is configured to reduce a volume of ambient sound from the local environment during the presentation of the audio of the virtual environment through the headphones.

In some implementations, the at least one sensor includes a camera that captures images of the local environment, and wherein analyzing the environmental input includes analyzing the captured images to identify the activity occurring in the local environment.

In some implementations, identifying the activity includes identifying an additional person in the local environment.

In some implementations, adjusting the level of active noise cancellation is configured, responsive to identifying the additional person, to reduce the level of active noise cancellation.

In some implementations, identifying the activity includes identifying proximity of an object to the user in the local environment.

In some implementations, adjusting the level of active noise cancellation is configured, responsive to identifying the proximity of the object to the user, to reduce the level of active noise cancellation.

In some implementations, the interactive application is a video game.

In some implementations, a method is provided, including the following method operations: executing a video game, wherein executing the video game generates a game state that is processed to render video and audio of a virtual environment, the video being presented on a display viewed by a player, and the audio being presented through headphones worn by the player, and wherein executing the video game is responsive to player input generated from interactivity by the player with the presented video and audio; determining a level of active noise cancellation to be applied by the headphones based on the game state; applying the determined level of active noise cancellation by the headphones, wherein the active noise cancellation is configured to reduce a volume of ambient sound from the local environment during the presentation of the audio of the virtual environment through the headphones.

In some implementations, determining the level of active noise cancellation to be applied by the headphones is based on a current gameplay progress location of the video game.

In some implementations, determining the level of active noise cancellation to be applied by the headphones is based on a current location of gameplay in the virtual environment of the video game.

In some implementations, determining the level of active noise cancellation to be applied by the headphones is based on a proximity of a player avatar to a virtual object in the virtual environment.

In some implementations, determining the level of active noise cancellation to be applied includes receiving a parameter value defined by the game state.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for adjusting noise cancellation in headphones based on real-world activity or game context.

Implementations of the present disclosure are drawn to methods and systems for automatically adjusting noise cancellation features on headphones. The methods include detection by one or more devices of a user's environment. The user's environment can be monitored using one or more cameras and/or motion detectors. The detection is configured to identify when another person is approaching the user or the user is unaware that he or she is moving toward an object (and may be in danger of injury). In one embodiment, the detection is dynamic and can be on-going during a session, and will be triggered in "anticipation" using machine learning, to start to reduce noise cancellation before the safety concern occurs. In one embodiment, the noise cancellation can be reduced in increments, and as the user approaches an unsafe location or something approaches the user, the noise cancellation can be reduced in increments. As the object leaves the user's zone, then the noise cancellation can gradually increase. In some cases, the noise cancellation can be instant, e.g., if a person is detected to be trying to communicate with the player. Then, the sound cancellation can be stopped at once, and then, restarted when the conversation has ended. Along with noise cancellation, the game sound can also be decreased or increased in addition to decreasing or increasing noise cancellation. In some cases, the video the user is watching, e.g., a game, can also provide a visual cue as to the possible need to speak with someone or to watch out and avoid an obstacle. The noise cancellation can also dynamically increase during certain game contexts. For example, if the user is approaching a critical game part or scene, the noise cancellation can be automatically increased to assist the user in concentration. In some cases, the automatic increase/decrease of noise cancellation can be built into a game by the developer, or can be a setting controlled by a game engine. These features can avoid breaks in immersion during high-relevance content.

With the above overview in mind, the following provides several example figures to facilitate understanding of the example embodiments.

Figure 1:
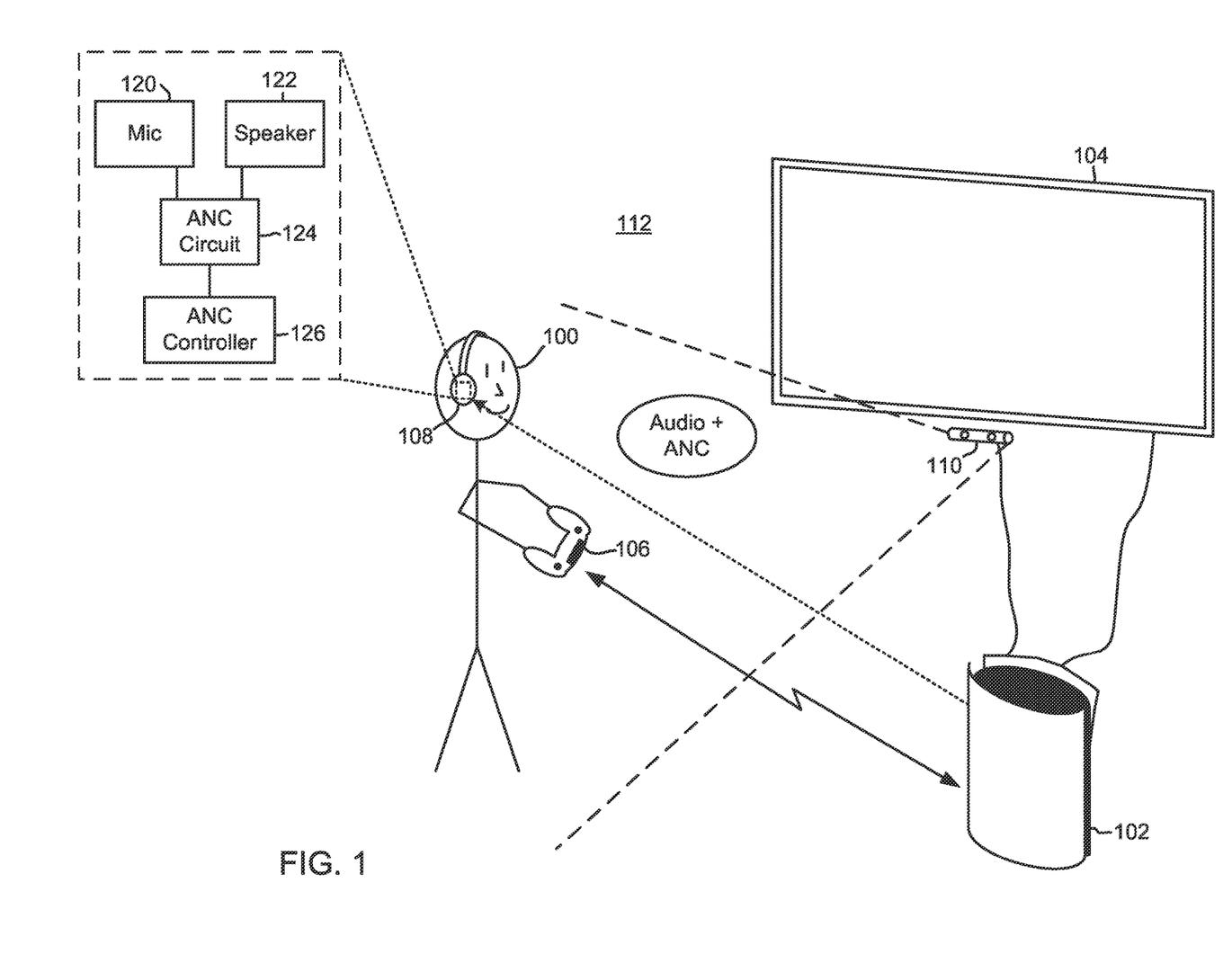
FIG. 1 illustrates a user engaged in gameplay of a video game, in accordance with implementations of the disclosure.

FIG. 1 illustrates a user engaged in gameplay of a video game, in accordance with implementations of the disclosure.

In the illustrated implementation, a user 100 is engaged in interactive gameplay of a video game that is executed by a computing device 102. By way of example without limitation, the computing device 102 can be a game console, personal computer, laptop, set-top box, or other general or special purpose computer having a processor and memory and capable of executing program instructions of a video game. Furthermore, while for purposes of illustrating an embodiment of the disclosure, a user interacting with a video game is described, it will be appreciated that the principles of the present disclosure can be applied to other types of interactive applications which may be executed by the computing device 102 and that the user 100 may interact with. Additionally, it will be appreciated that in other implementations, at least some of the functionality ascribed to the computing device 102 can be cloud-executed by a remote compute resource.

The execution of the video game by the computing device 102 includes rendering video and audio of a virtual environment of the video game. The video is presented on a display 104 (e.g. television, monitor, LED/LCD display, projector screen, etc.) viewed by the user 100. As the user 100 engages in interactivity with the video game, the user 100 may operate a user input device such as a controller 106 in the illustrated implementation, that generates user input for the video game. It will be appreciated that the executing video game is responsive to the user input generated as a result of the user's interactivity, and continually updates its game state based on the user input to drive the execution of the video game.

The audio generated by the video game is presented through headphones 108 worn by the user 100. The headphones 108 can be wired or wireless, and may be connected directly or indirectly to the computing device 102. For example, in some implementations, the headphones 108 connect to the controller 106, and the controller 106 communicates with the computing device 102 to receive audio that it then passes to the headphones 108 for presentation.

The headphones 108 are equipped with active noise cancellation (ANC) which, broadly speaking, is capable of reducing the volume of ambient sounds from the local environment 112 in which the user 100 is disposed. To enable the active noise cancellation, the headphones 108 include a microphone 120 that detects ambient sound, and an ANC circuit 124 that receives the microphone's signal and generates an opposite-phase signal that, when fed to a speaker 122, produces sound waves that cancel at least some of the ambient sound arriving at the user's ears. An ANC controller 126 is configured to set or adjust a level/amount of the active noise cancellation that is applied at any given moment. As discussed in further detail below, the level of ANC can be adjusted from moment to moment depending on various factors.

While ANC serves to enhance the immersiveness of the gaming experience by blocking ambient sounds that might interfere with the user's experience, there can be times when it is useful to reduce the immersion, to allow the user to be more aware of their surroundings. For example, another person might be attempting to get the attention of the user, or the user may be unknowingly moving towards a potentially harmful situation such as potentially colliding with an object in the local environment. Furthermore, ANC can be selectively utilized in the context of the video game to selectively enhance immersion of certain portions of the game. Thus, while ANC is typically used in an on/off binary fashion operated by the user, implementations of the present disclosure provide for automatic dynamic adjustment of ANC level in response to situational factors and the video game itself.

In the illustrated implementation, an environmental detection device 110 includes at least one sensor capable of sensing the local environment 112, such as by detecting events or objects in the local environment 112. By way of example without limitation, the sensors of the environmental detection device 110 can include one or more image capture devices or cameras, motion sensors, microphones, depth sensors, etc. Broadly speaking, the sensors of the environmental detection device 110 generate environmental input, which is received and analyzed by the computing device 102 to identify activity occurring in the local environment 112. In some implementations, the analysis can entail recognition of objects or activity using a machine learning model or other recognition model. And the level of ANC applied by the headphones 108 is adjusted based on the identified activity.

In some implementations, the computing device 102 generates ANC control data that is transmitted to the headphones 108 and applied by the headphones 108, and more specifically by the ANC controller 126, to control the level of ANC implemented by the ANC circuit 124. In some implementations, the ANC is controlled in predefined levels or increments, with adjustments occurring in a stepwise fashion. In other implementations, the ANC is controlled in a substantially continuous manner, with adjustments occurring in substantially continuous and gradual fashion. It will be appreciated that the specified amount or level of ANC that is set at a given moment in time will govern the amplitude of the opposite-phase sound waves generated by the speaker 122 of the headphones 108, and thereby govern the extent to which the volume of ambient sound heard by the user is reduced by the ANC.

In some implementations, the level of ANC is controlled in response to game conditions. For example, in some implementations, the level of ANC is a programmable parameter that can be defined by the video game for particular scenes or locations (spatial or temporal) within the game, or for particular game states. In this manner, for example, the ANC can be increased to enhance user immersion during high relevance content.

Figure 2:
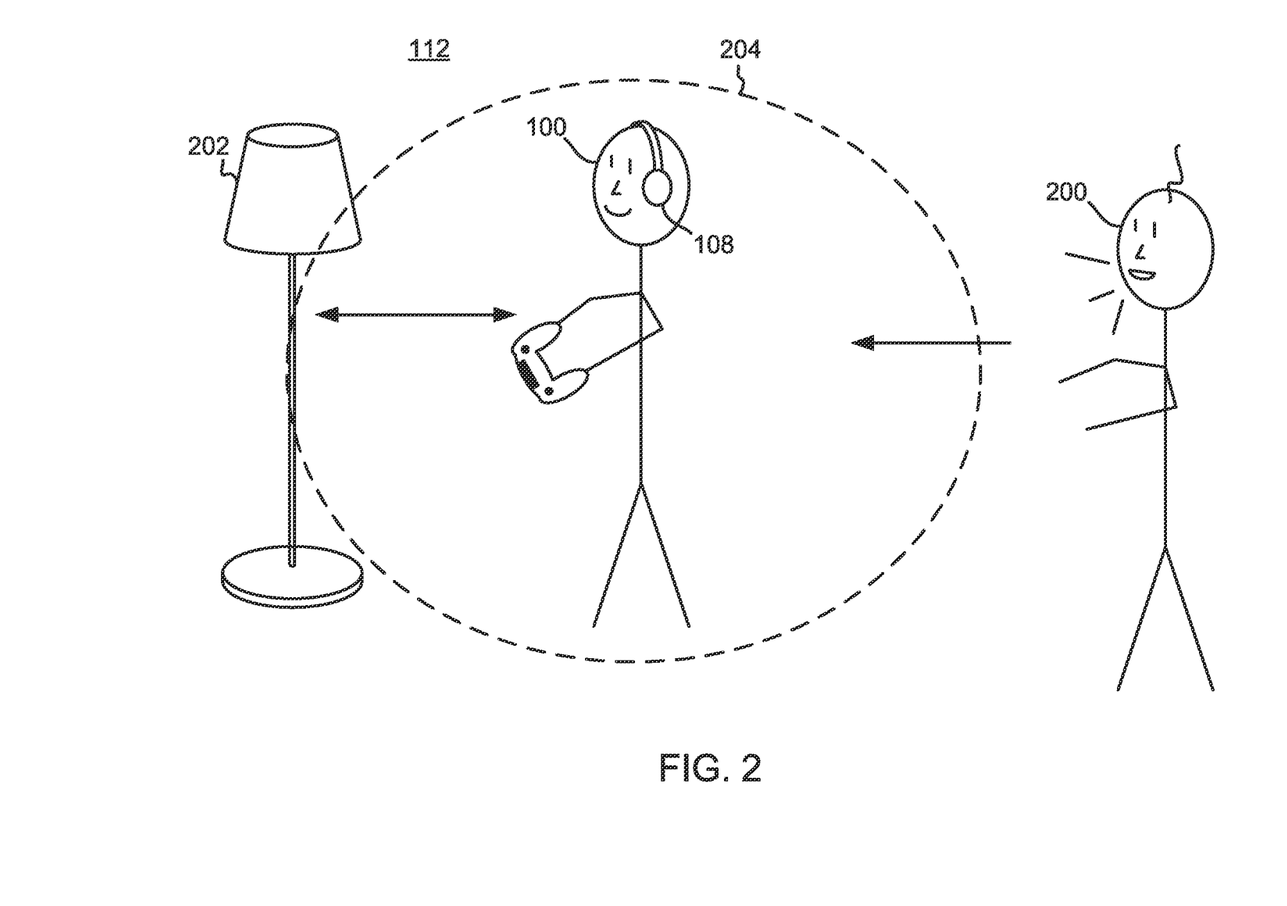
FIG. 2 illustrates a user engaged in gameplay of a video game, and encountering situations for which ANC may be adjusted, in accordance with implementations of the disclosure.

FIG. 2 illustrates a user engaged in gameplay of a video game, and encountering situations for which ANC may be adjusted, in accordance with implementations of the disclosure.

In the illustrated implementation, the user 108 is engaged in gameplay of a video game in accordance with implementations described above. The local environment 112 is being sensed and certain events and objects can be identified, and based on the identification, the ANC of the headphones 108 can be adjusted.

For example, in some implementations, when another person 200 is detected in the vicinity of the user 100, or identified to be moving towards user 100, then the ANC level is reduced or turned off, so as to allow the user 100 to more easily hear or be aware of the other person 200. In some implementations, if the person 200 attempts to speak to the user 100, then the speech by the person 200 is recognized and triggers immediate turning off of ANC. In some implementations, other types of recognized objects can trigger similar adjustments to ANC, such as detection of a pet animal.

In some implementations, ANC levels can be adjusted for the safety of the user 100. For example, if it is detected that the user is moving too close to an object, such as the lamp 202, and may be at risk of a collision with the object, then the ANC can be reduced or turned off. For example, in some implementations, as the user 100 moves towards an object, then ANC can be reduced to a greater extent as the user 100 moves progressively closer to the object.

In some implementations, a proximate zone 204 is defined around the user 100, e.g. at a predefined distance from the user 100, such that when an object crosses into the proximate zone 204, then ANC is reduced or turned off. In further implementations, there can be multiple proximate zones 204 defined at various distances from the user 100, with the proximate zones being correlated to various levels of ANC, such that ANC reduction increases with decreasing distance of a detected object from the user 100. In another implementation, when an object enters the proximate zone 204, then ANC begins to be reduced, with further reduction in ANC occurring as the distance of the object from the user 100 decreases. In some implementations, when the distance of the object reaches another predefined distance from the user 100, then ANC is completely turned off.

In some implementations, the ambient sounds can be recognized and may trigger adjustment of ANC. For example, in addition to human speech, other recognized sounds may trigger reduction or turning off of ANC, such as other human sounds (e.g. baby crying, person in distress), a ringtone of a mobile device, a sound of a pet (e.g. barking by a dog), alarm sounds, emergency vehicle sounds, timer sounds (e.g. an oven timer), a doorbell sound, sounds/notifications from a smart speaker, etc.

It will be appreciated that after ANC has been reduced in situations such as those described above, then the ANC level can be increased when such situations are detected to be reversed or no longer present in the local environment 112 of the user 100. For example, ANC level can be increased as distance of an object from the user 100 increases.

Figure 3:
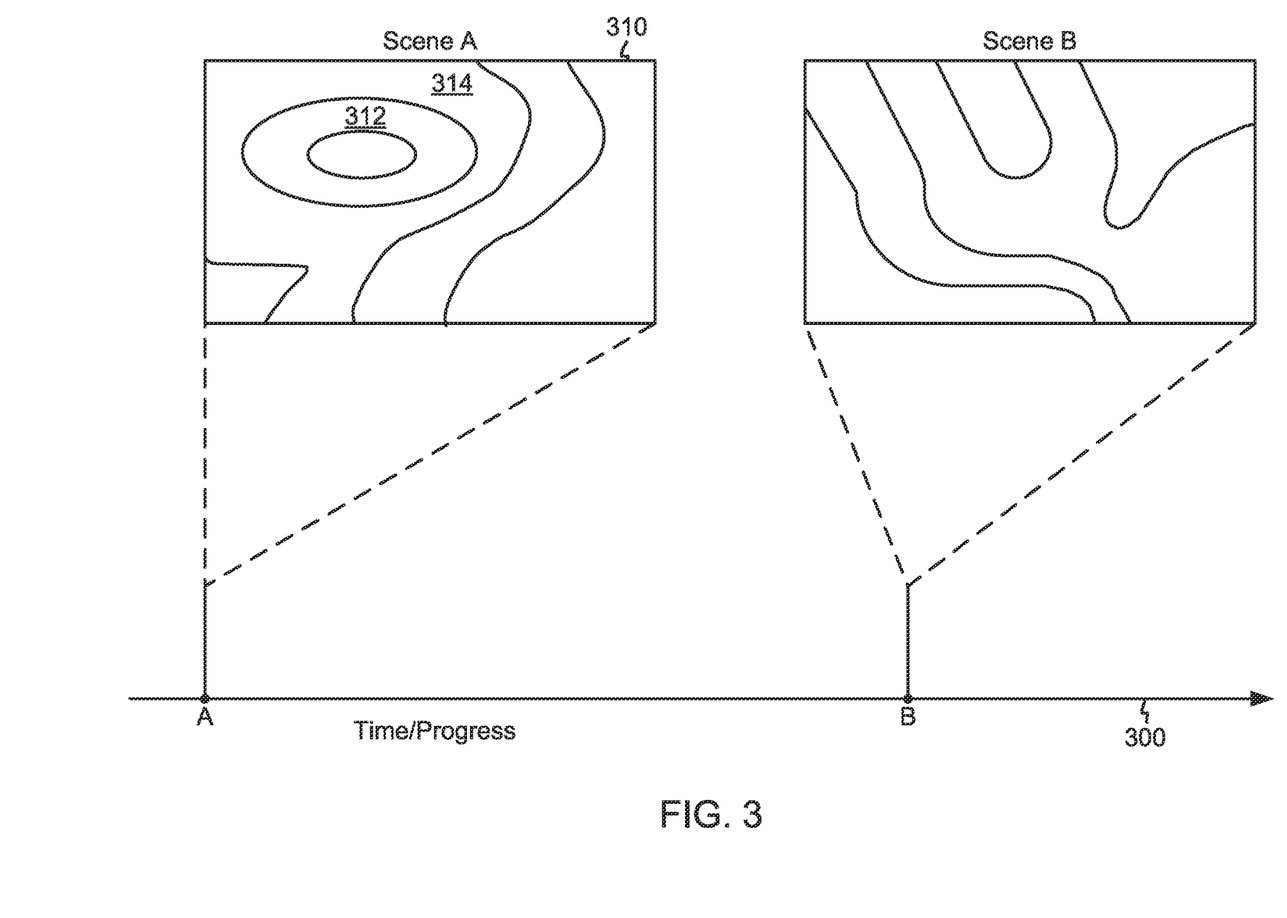
FIG. 3 conceptually illustrates gameplay progress and scenes in a video game, in accordance with implementations of the disclosure.

FIG. 3 conceptually illustrates gameplay progress and scenes in a video game, in accordance with implementations of the disclosure.

In the illustrated implementation, progress in a video game is conceptually illustrated by the storyline 300, wherein movement from left to right along the storyline 300 represents progress in the video game, for example, as defined by achievement of objectives, movement to predefined locations of the video game's virtual environment, temporal movement/achievement along a timeline of the video game's narrative or story, etc.

In some implementations, the level of ANC can be set or adjusted based on the current progress location of the user's gameplay of the video game. For example, at a progress point A along the storyline 300, the level of ANC may be set at a first predefined level, whereas at a progress point B along the storyline 300, the level of ANC may be set at a second predefined level. In some implementations, the video game developer may set a parameter governing or influencing ANC level in association with the game's storyline. And thus, as the user progresses through the game's storyline, then the ANC level is adjusted in accordance with the parameter set for the particular progress point of the user's current gameplay. In this manner, in some implementations, ANC can be increased at certain points to selectively enhance the immersiveness of the gaming experience at particular times along the storyline. This can help the user to focus or concentrate better in certain contexts of the video game. For example, ANC level can be increased during game scenes having dialogue, so that the user is better able to hear and understand the dialogue. Or more generally, as the gameplay approaches high focus, high valence/intensity or critical moments, the ANC can be increased to help reduce real-world distractions and enhance immersiveness.

Additionally, in some implementations, a parameter governing or influencing ANC level can be associated to spatial locations within the virtual environment of the video game. For example, at the progress point A, the user may be engaged in gameplay in a Scene A of the video game having a virtual environment conceptually shown by the map 310. In some implementations, various regions of the virtual environment may have different levels of ANC assigned thereto, or different parameter values assigned thereto that govern or influence the level of ANC when the user's position (e.g. position of a character controlled by the user, or other entity controlled by the user during gameplay) is located is in a particular region of the virtual environment. For example, the region 312 may have a first ANC level associated thereto, whereas the region 314 may have a second ANC level associated thereto. Thus, as the user moves throughout the virtual environment of Scene A, then the ANC level is dynamically adjusted in response to the user's location in the virtual environment of Scene A.

It will be appreciated that a different scene of the video game, such as a Scene B that is reached at the progress point B, will have a different arrangement of ANC level or parameter set in association with the respective virtual environment of Scene B. And as the user moves throughout various regions of the virtual environment, the ANC can be dynamically adjusted based on the user's location in the virtual environment. Again, such ANC adjustment/setting can be used to selectively enhance immersion of certain locations in the virtual environment of the video game.

In a related implementation, ANC can be adjusted in relation to the user's proximity (e.g. proximity of the user's avatar/character) to a given virtual object in the virtual environment of the video game. For example, ANC may be increased when the user approaches another character in the game, as there may be dialogue with the other character about to take place so that increasing ANC will help the user hear the dialogue better.

In some implementations, ANC is increased during quieter scenes of the video game, to enable the user to better hear quieter sounds in such scenes, or to amplify the effect of silence/quietude. Whereas ANC can be decreased during louder scenes, as it may not be as necessary for hearing the louder sounds of such scenes.

In some implementations, the ANC parameter or setting is defined as part of a game engine or gaming platform (e.g. console game platform). And accordingly, a video game developed using the game engine or for the gaming platform can leverage the ANC parameter to achieve selective application of ANC in certain contexts of the video game, and increase the impact of the game.

Figure 4:
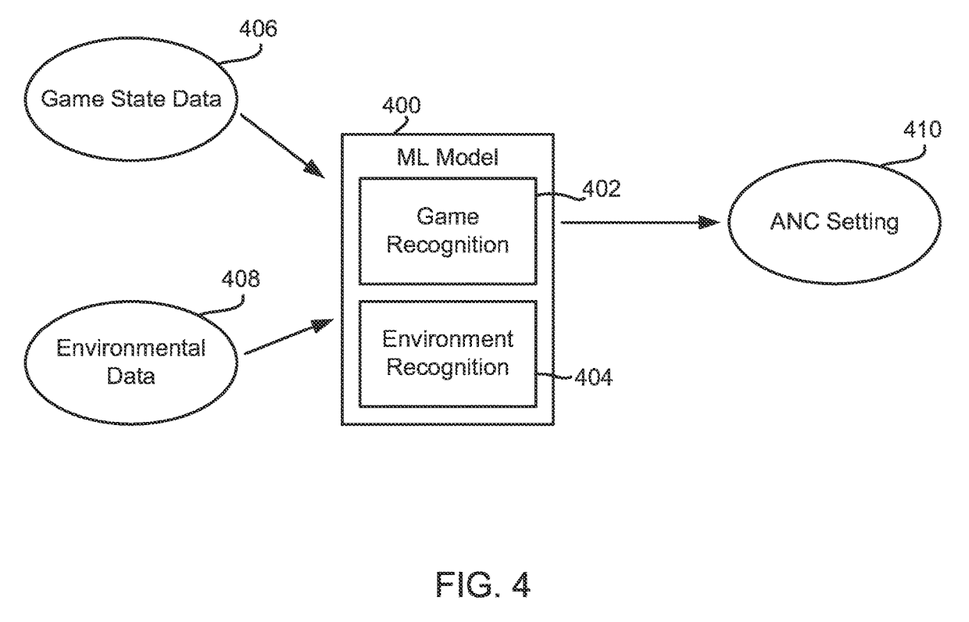
FIG. 4 conceptually illustrates use of a machine learning (ML) model to determine active noise cancellation settings for headphones, in accordance with implementations of the disclosure.

FIG. 4 conceptually illustrates use of a machine learning (ML) model to determine active noise cancellation settings for headphones, in accordance with implementations of the disclosure.

In the illustrated implementation, a machine learning (ML) model 400 is configured and trained to recognize/identify objects, situations or events, in the video game and/or in the local environment, and determine the ANC setting for headphones accordingly. For example, the ML model 400 may be trained using labeled training data. The ML model 400 can be executed by the aforementioned computing device 102 in some implementations, or cloud-executed in other implementations.

The ML model 400 can be configured to perform game recognition 402 based on game state data 406 of the executing video game. That is, the ML model 400 can recognize game objects and situations/events occurring in the video game. By way of example without limitation, the game state data 406 can include data items such as user/controller inputs, game progress/scene information, virtual object/character information, virtual environment location information, etc.

The ML model 400 can further be configured to perform environmental recognition 404 using environmental data 408, to recognize objects/persons and events occurring in the local environment. Examples of such environmental data 408 include captured images or video of the local environment, captured audio, or other types of data from sensors that sense the local environment.

Based on the events occurring in the executing video game and the local environment in which the user is situated, the ANC setting 410 can be dynamically determined by the ML model 400. While the ML model 400 is described as a singular entity, in some implementations, the ML model 400 can consist of multiple machine-learning models.

It will be appreciated that the ML model's 400 analysis can be predictive so that future activity is predicted, and the ANC setting 410 is predictively determined/adjusted in anticipation of the future activity. For example, a potential collision or other potential unsafe situation for the user may be predicted, and the ANC setting 410 predictively reduced as a result.

While adjustment of ANC has been described, in some implementations, along with noise cancellation adjustment, the game sound can also be decreased or increased in addition to decreasing or increasing noise cancellation. In this manner, game sound can be decreased at the same time that ambient sound volume is increased for the user (through reduction of ANC), or game sound increased at the same time that ambient sound volume is decreased (through increase in ANC). Furthermore, in some implementations, the video the user is watching, e.g., a game, can also provide a visual cue as to the possible need to speak with someone or to watch out and avoid an obstacle. In some implementations, such a visual cue can take the form of a written notification message, a graphic overlay, a pointer or arrow indicating the user should look in a particular direction, etc.

Figure 5:
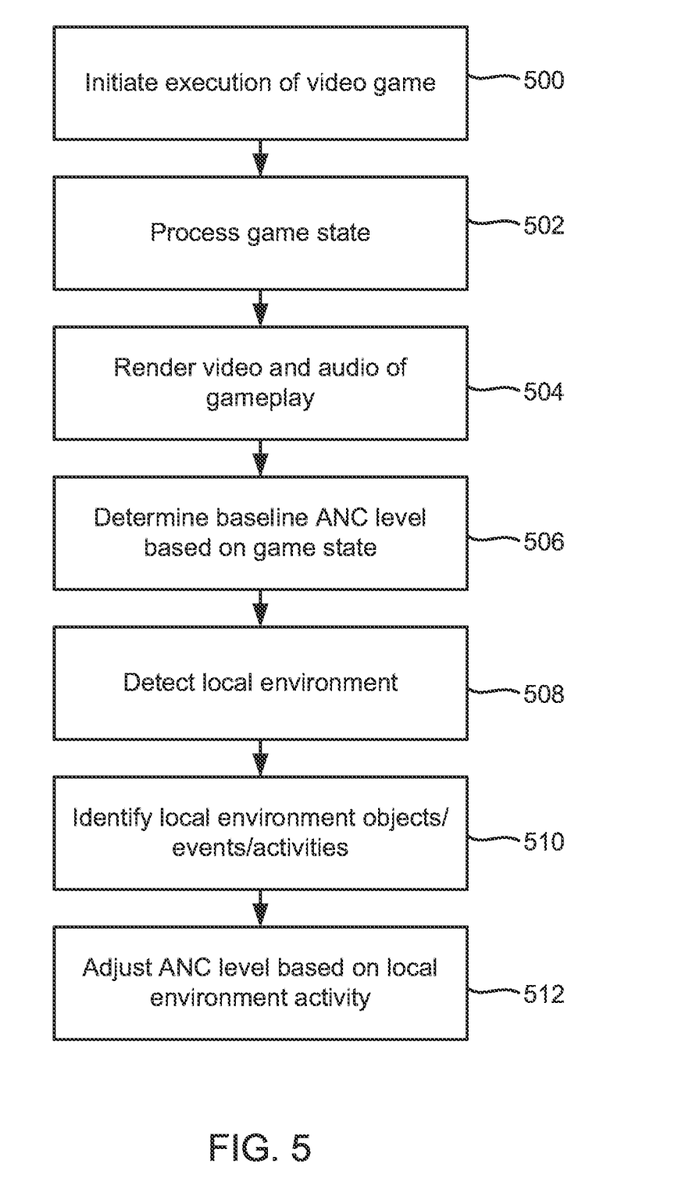
FIG. 5 conceptually illustrates a method for controlling active noise cancellation during execution of a video game, in accordance with implementations of the disclosure.

FIG. 5 conceptually illustrates a method for controlling active noise cancellation during execution of a video game, in accordance with implementations of the disclosure.

At method operation 500, execution of a video game is initiated. At method operation 502, the execution of the video game is carried out by processing a game state of the video game. This can include processing user input to drive the execution and continually update the game state over time and in response to user interactivity. At method operation 504, gameplay video and audio (e.g. from a virtual environment of the video game) is rendered.

At method operation 506, a baseline ANC level is determined based on the game state of the video game. As discussed above, this can be determined based on the particular context of the gameplay, the player's progress, game scene, location, etc.

At method operation 508, the local environment in which the player is disposed is detected, such as by sensing equipment such as cameras, microphones, motion sensors, etc. At method operation 510, activity in the local environment is identified, based on the detection of the local environment. This can entail identification/recognition of objects and events occurring in the local environment.

At method operation 512, the baseline ANC level is adjusted based on the identified activity in the local environment. In this manner, the amount of ANC applied at any given moment during gameplay is determined by both the video game and the state of activity in the player's local environment.

Figure 6:
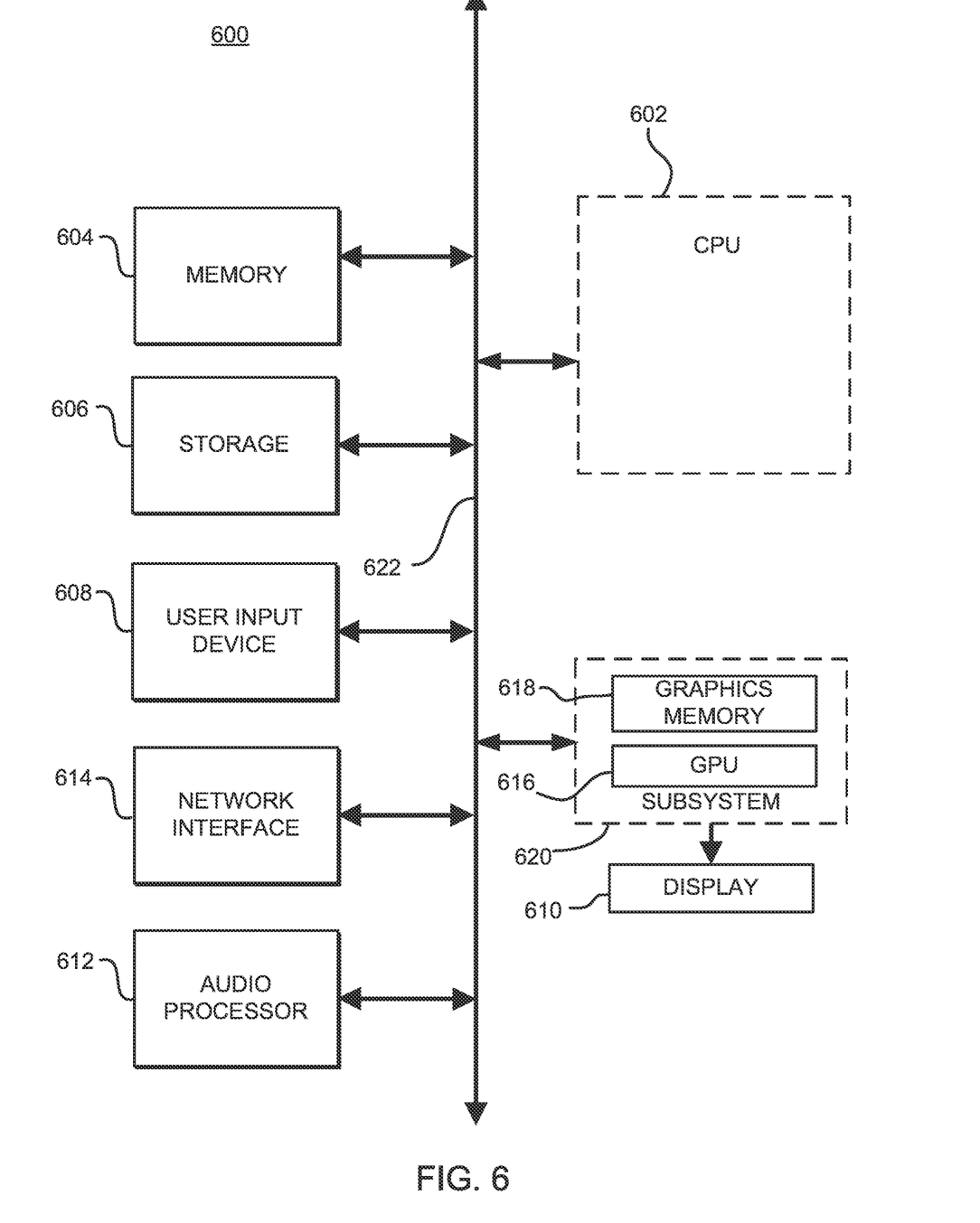
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
executing an interactive application, wherein executing the interactive application includes rendering video and audio of a virtual environment, the video being presented on a display viewed by a user, and the audio being presented through headphones worn by the user, and wherein executing the interactive application is responsive to user input generated from interactivity by the user with the presented video and audio, wherein the user input controls a current virtual location in the virtual environment that is depicted in the rendered video and audio;
receiving environmental input from at least one sensor that senses a local environment in which the user is disposed;
analyzing the environmental input to identify activity occurring in the local environment;
responsive to identifying the activity, and based on the current virtual location in the virtual environment, then adjusting a level of active noise cancellation applied by the headphones.

2. The method of claim 1, wherein the active noise cancellation is configured to reduce a volume of ambient sound from the local environment during the presentation of the audio of the virtual environment through the headphones.

3. The method of claim 1, wherein the at least one sensor includes a camera that captures images of the local environment, and wherein analyzing the environmental input includes analyzing the captured images to identify the activity occurring in the local environment.

4. The method of claim 1, wherein identifying the activity includes identifying an additional person in the local environment.

5. The method of claim 4, wherein adjusting the level of active noise cancellation is configured, responsive to identifying the additional person, to reduce the level of active noise cancellation.

6. The method of claim 1, wherein identifying the activity includes identifying proximity of an object to the user in the local environment.

7. The method of claim 6, wherein adjusting the level of active noise cancellation is configured, responsive to identifying the proximity of the object to the user, to reduce the level of active noise cancellation.

8. The method of claim 1, wherein the interactive application is a video game.

9. The method of claim 1, wherein the display is included in a head-mounted display worn by the user.

10. A non-transitory computer readable medium having program instructions embodied thereon that, when executed by at least one computing device, cause said at least one computing device to perform a method including the following operations:

executing an interactive application, wherein executing the interactive application includes rendering video and audio of a virtual environment, the video being presented on a display viewed by a user, and the audio being presented through headphones worn by the user, and wherein executing the interactive application is responsive to user input generated from interactivity by the user with the presented video and audio, wherein the user input controls a current virtual location in the virtual environment that is depicted in the rendered video and audio;

receiving environmental input from at least one sensor that senses a local environment in which the user is disposed;

analyzing the environmental input to identify activity occurring in the local environment;

responsive to identifying the activity, and based on the current virtual location in the virtual environment, then adjusting a level of active noise cancellation applied by the headphones.

11. The non-transitory computer readable medium of claim 10, wherein the active noise cancellation is configured to reduce a volume of ambient sound from the local environment during the presentation of the audio of the virtual environment through the headphones.

12. The non-transitory computer readable medium of claim 10, wherein the at least one sensor includes a camera that captures images of the local environment, and wherein analyzing the environmental input includes analyzing the captured images to identify the activity occurring in the local environment.

13. The non-transitory computer readable medium of claim 10, wherein identifying the activity includes identifying an additional person in the local environment.

14. The non-transitory computer readable medium of claim 13, wherein adjusting the level of active noise cancellation is configured, responsive to identifying the additional person, to reduce the level of active noise cancellation.

15. The non-transitory computer readable medium of claim 10, wherein identifying the activity includes identifying proximity of an object to the user in the local environment.

16. The non-transitory computer readable medium of claim 15, wherein adjusting the level of active noise cancellation is configured, responsive to identifying the proximity of the object to the user, to reduce the level of active noise cancellation.

17. The non-transitory computer readable medium of claim 10, wherein the display is included in a head-mounted display worn by the user.

* * * * *